US 7,911,110 B2

(12) United States Patent
Choi et al.

(10) Patent No.: US 7,911,110 B2
(45) Date of Patent: Mar. 22, 2011

(54) DOUBLE ROTOR TYPE MOTOR

(75) Inventors: Soung Bong Choi, Changwon-si (KR);
Seong Hai Jeong, Changwon-si (KR);
Yeong Soo Kim, Changwon-si (KR);
Hung Myong Cho, Gimhac-si (KR); In Geun Ahn, Changwon-si (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 10/592,870

(22) PCT Filed: Jan. 18, 2006

(86) PCT No.: PCT/KR2006/000191
§ 371 (c)(1),
(2), (4) Date: Dec. 19, 2008

(87) PCT Pub. No.: WO2006/078114
PCT Pub. Date: Jul. 27, 2006

(65) Prior Publication Data
US 2009/0115278 A1    May 7, 2009

(30) Foreign Application Priority Data

Jan. 19, 2005 (KR) .................. 10-2005-0004985
Jan. 24, 2005 (KR) .................. 10-2005-0006266
Jan. 24, 2005 (KR) .................. 10-2005-0006267
Jan. 27, 2005 (KR) .................. 10-2005-0007543

(51) Int. Cl.
*H02K 1/22* (2006.01)
(52) U.S. Cl. ...................... 310/266; 310/114
(58) Field of Classification Search .............. 310/266, 310/43, 112–114, 89
See application file for complete search history.

(56) References Cited

U.S. PATENT DOCUMENTS

| | | | | |
|---|---|---|---|---|
| 6,992,419 | B2 * | 1/2006 | Kim et al. | 310/266 |
| 7,356,906 | B2 * | 4/2008 | Kim et al. | 29/596 |
| 7,443,074 | B2 * | 10/2008 | Kim et al. | 310/266 |
| 7,652,406 | B2 * | 1/2010 | Kim et al. | 310/266 |
| 2004/0245878 | A1 * | 12/2004 | Kim et al. | 310/114 |
| 2006/0066173 | A1 * | 3/2006 | Kim et al. | 310/266 |

FOREIGN PATENT DOCUMENTS

| | | |
|---|---|---|
| EP | 1 094 145 | 4/2007 |
| KR | 10-2004-0002349 | 1/2004 |
| KR | 10-2004-0045732 | 6/2004 |
| KR | 10-2005-0000245 | 1/2005 |
| WO | WO 2004/004098 | 1/2004 |

OTHER PUBLICATIONS

International Search Report dated Mar. 9, 2009.

* cited by examiner

*Primary Examiner* — Thanh Lam
(74) *Attorney, Agent, or Firm* — Ked & Associates, LLP (57) ABSTRACT

The present invention relates to motors, and more particularly, to a double rotor type motor applicable to a washing machine or the like. The double rotor type motor includes an outer rotor having first base, and a first extension extended from a circumference of the first base substantially perpendicular thereto, the first extension having outer magnets mounted on an inside circumferential surface, an inner rotor having a second base mounted on an upper surface of the first base concentric to the first base, and a second extension extended from a circumference of the second base so as to be opposite to the first extension with a predetermined gap toward an inner side of the first extension, the second extension having inner magnets mounted on an outside circumferential surface, and a bushing at a center of the first base and the second base, for transmission of rotation force both from the outer rotor and the inner rotor to a rotating shaft.

33 Claims, 10 Drawing Sheets

DOUBLE ROTOR TYPE MOTOR

TECHNICAL FIELD

The present invention relates to motors, and more particularly, to a double rotor type motor applicable to a washing machine or the like.

BACKGROUND ART

In general, the washing machine washes laundry by using friction between washing water and the laundry in a drum rotated by a motor in a state detergent, washing water, and the laundry is introduced into the drum. The drum is a washing tub for holding washing water and the laundry, and applicable to the washing machine, irrespective of the washing machine being of a drum type or a pulsator type.

In the meantime, depending on driving types of the washing machine, there are indirect coupling type in which driving power is transmitted from the motor to the drum indirectly through a belt wound around a motor pulley and a drum pulley, and a direct coupling type in which the motor is directly coupled to the drum, to transmit driving power from the motor to the drum, directly.

The type of washing machine in which driving power is transmitted from the motor to the drum indirectly through a belt wound around a motor pulley and a drum pulley causes an energy loss in a course of the driving power transmission, and generates much noise in the power transmission course. Consequently, in order to solve such problems, it is a recent trend that use of washing machines having the direct coupling drum type motors applied thereto increases.

Figure 1:
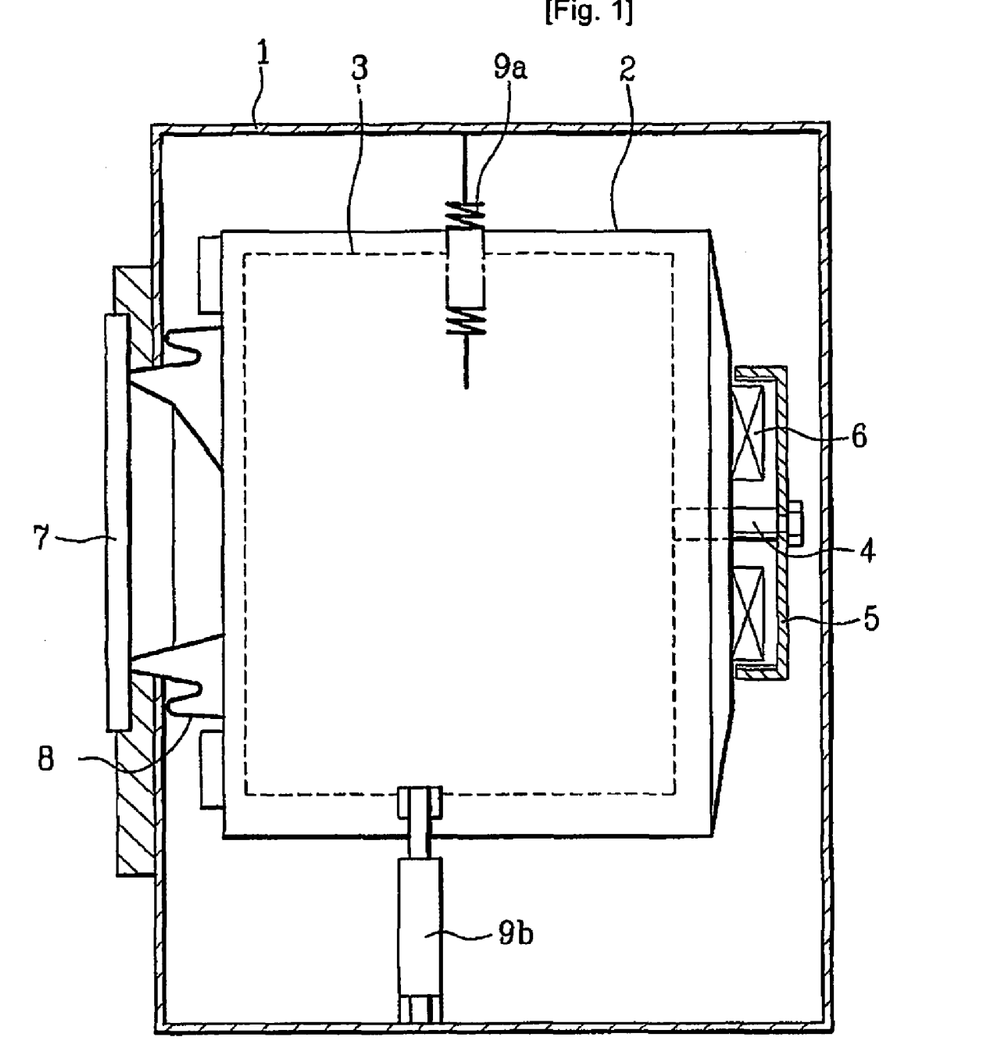
FIG. 1 illustrates a section of a drum type washing machine having a related art motor applied thereto.
Figure 2:
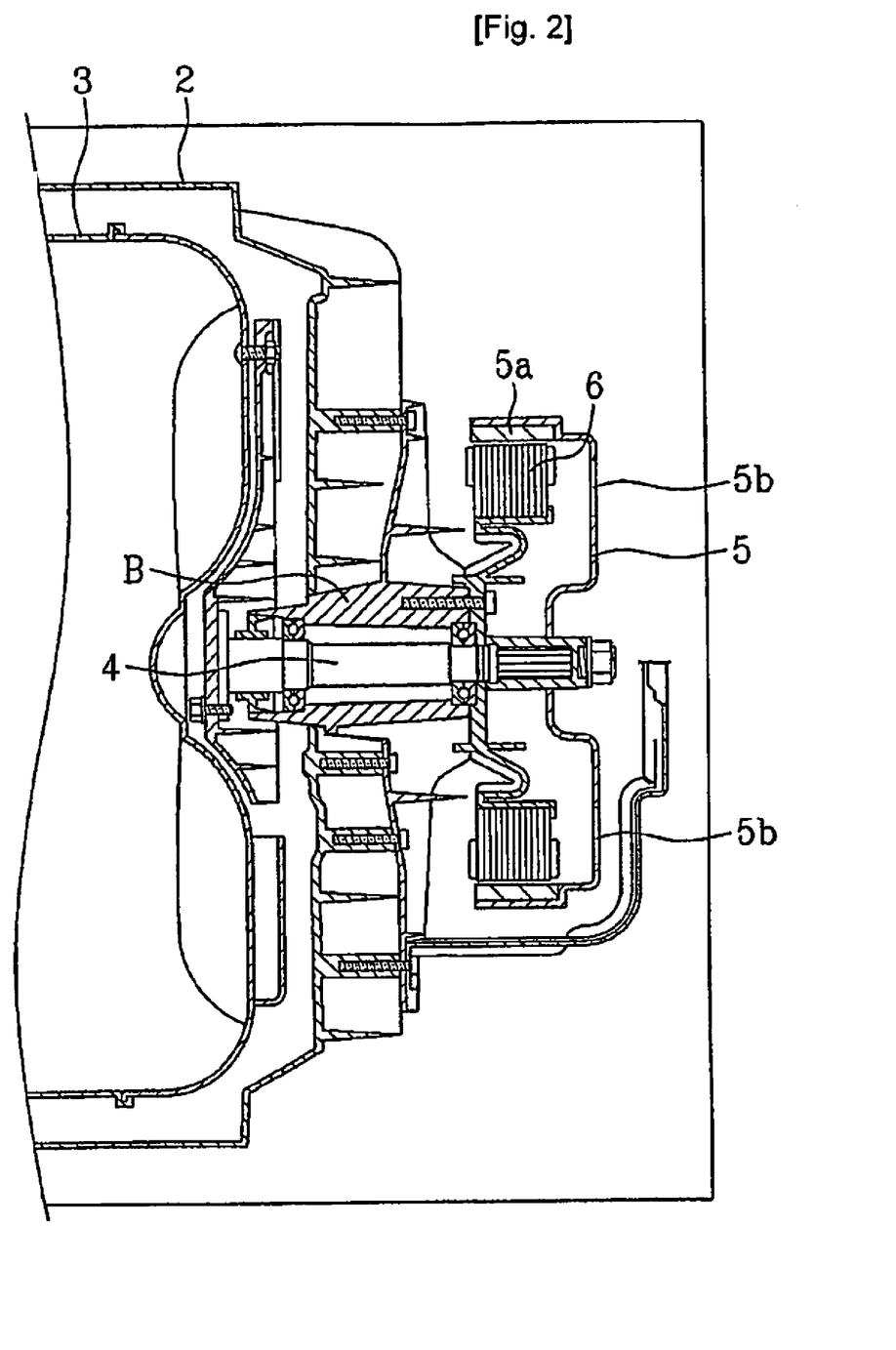
FIG. 2 illustrates an enlarged sectional view of the related art motor and a portion having the related art motor mounted thereon.

FIGS. 1 and 2 illustrate sections showing a related art drum type washing machine and a motor, respectively.

Referring to FIG. 1, there is a tub 2 in a cabinet 1, with a drum 3 rotatably mounted on a center of an inside of the tub 2.

At a rear of the tub 2, there is a motor having a stator 6 and a rotor 5, wherein the stator 6 is fixedly secured to a rear wall of the tub, and the rotor 5 surrounds the stator 6, and is fixed to a shaft 4 that passes through the tub and is connected to the drum 3. Though not shown in detail, on an inside surface of the rotor 5, there are magnets of opposite poles arranged alternately.

Together with this, it is preferable that there is a metal tub supporter (not shown) between the tub rear wall and the stator, having a shape in conformity with an exterior shape of the rear wall of the tub 2, to be fixedly secured to the rear wall of the tub at the time the stator is secured, for supporting a weight of the stator, and maintaining concentricity of the stator.

In the meantime, there is a door 7 on a front of the cabinet 1, with a gasket 8 between the door 7 and the tub 2.

There are hanging springs 9a between an inside of an upper side of the cabinet 1 and an upper side of an outside circumference of the tub 2, for supporting the tub 2, and friction dampers 9b between an inside of a lower side of the cabinet 1 and a lower side of an outside circumference of the tub 2.

In the meantime, FIG. 2 illustrates an enlarged sectional view of the motor and a portion having the motor mounted thereon, wherein the related art stator 6 is fixedly secured to a bearing housing 'B' fixed to a rear wall of the tub 2, and the rotor 5 is rotatably mounted to an outside of the stator 6. There is a rotating shaft 4 having one end fixed to a center of the rotor 5, and the other end connected to the drum 3 or the like. Mounted on an inside circumferential surface of the rotor 5, there are permanent magnets 5a. The stator 6 has cores and coils each wound around an outside circumference of the core, to function as an electromagnet.

Therefore, upon supply of power to the coil, the rotor rotates by action of a rotating magnetic field between the permanent magnets and the electromagnet, and rotation torque of the rotor 5 is transmitted to the drum 3 or the like through the rotation shaft 4.

In a bottom of a frame of the related art rotor, there are holes 5b for passing through of external air to cool down heat generated at the time of operation of the motor.

However, currently, keeping pace with capacity increase of the washing machine, though it is required to increase an output of the motor for rotating the drum too, such an increased output of the motor requires large sized rotor and stator, to increase size and weight of the motor, significantly.

Consequently, the increase of the motor size causes to increase a size of the washing machine or the like having the motor applied thereto, significantly.

Accordingly, a motor is required, which increases an output of the motor without increasing a size of die related art motor.

DISCLOSURE OF INVENTION

Technical Problem

An object of the present invention to provide a double rotor type motor which can increase an output of the motor compared to a size of the motor significantly applicable to a washing machine or the like.

Technical Solution

The object of the present invention can be achieved by providing a double rotor type motor including an outer rotor having a first base, and a first extension extended from a circumference of the first base substantially perpendicular thereto, the first extension having outer magnets mounted on an inside circumferential surface, an inner rotor having a second base mounted on an upper surface of the first base concentric to the first base, and a second extension extended from a circumference of the second base so as to be opposite to the first extension with a predetermined gap toward an inner side of the first extension, the second extension having inner magnets mounted on an outside circumferential surface, and a bushing at a center of the first base and the second base, for transmission of rotation force both from the outer rotor and the inner rotor to a rotating shaft.

The double rotor type motor further includes a stator for forming a rotating magnetic field between the outer magnets and the inner magnets to rotate the outer rotor and the inner rotor.

It is preferable that the stator includes cores each with a coil wound thereon placed between the first extension and the second extension.

In another aspect of the present invention, a double rotor type motor includes an outer rotor having a first base, and a first extension extended from a circumference of the first base substantially perpendicular thereto, the first extension having outer magnets mounted on an inside circumferential surface, an inner rotor having a second base mounted on an upper surface of the first base, and a second extension extended from a circumference of the second base so as to be opposite to the first extension with a predetermined gap toward an inner side of the first extension, the second extension having inner magnets mounted on an outside circumferential surface, and a bushing secured to an underside of the first base for supporting a rotating shaft.

The first base at a center thereof and the bushing at an upper side thereof include align holes and/or align projections fit to one another when the first base and the bushing are coupled. In other words, the align holes may be formed only at the center of the first base or in an upper side of the bushing, or both. Of course, in this case, the align projections are required to be formed in correspondence to the align holes.

In the meantime, the align holes and the align projections are only one embodiment of positioning means for making easy alignment and joining of the outer rotor, the inner rotor, and the bushing.

The first base includes a bushing receiving portion at a center, having the align holes in a circumferential direction. Preferably, the busing receiving portion is projected upward. It is preferable that the bushing receiving portion has the align holes or the align projections.

In this instance, the align hole has a cylindrical portion on a circumference having the same diameter for guiding placing in of the align projection. Preferably, the align projection includes a body portion having a consistent diameter, and a guide portion having a diameter which becomes the smaller as it goes from the body portion to a tip the more.

The bushing receiving portion and the bushing may be fastened together with screws fastened at predetermined angular intervals in a circumferential direction.

The first base and the second base may be joined by caulking hole portions, or TOX round jointing.

The first extension may be curled outwardly at a top edge thereof for reinforcing strength, and a likely, the second extension may be curled outwardly at a top edge thereof. The curled top edge has a width smaller than a thickness of the inner magnet.

Moreover, the second base may have a plurality of embossed portions in a circumferential direction at predetermined angular intervals for reinforcing strength.

The outer magnets and the inner magnets may be permanent magnets having N poles and S poles arranged alternately along a circumferential direction of the first extension and the second extension. It is preferable that the permanent magnet is convex.

In the meantime, the motor may further includes cooling holes for cooling the motor, particularly, the stator.

The cooling holes may be formed in the first base or the second base, and preferably along a circumferential direction. It is more preferable that the cooling holes are formed between the first extension and the second extension.

It is preferable that guide members are provided to the cooling hole at circumferential direction opposite edges for guiding movement of air, and the guide members may be projected inwardly with a slope. The guide members may be formed as one body with the edges of the cooling hole.

In the meantime, the double rotor type motor may further include pass through slots in the first base and the second base opposite to each other for making an inside space of the inner rotor in communication with an outside of the motor, for cooling the motor.

The pass through slots are elongated in a radial direction of the first, and second bases respectively and arranged in a circumferential direction at predetermined angular intervals.

In the meantime, in another aspect of the present invention, a double rotor type motor having an opening at a center of a first base and a second base. The bushing may be joined with the first base or the second base. Of course, the bushing may be joined both with the first base and the second base, and the bushing may have the rotating shaft placed therein and supported thereon.

In more detail, it is preferable that the bushing is joined with a portion around the opening at the center of the first base and/or the second base, and the portion is projected upward.

Preferably, the bushing is insert molded in a portion around the opening. The portion around the opening of the outer rotor has holding holes for filling molding material of the bushing therein and set thereon at the time of the insert molding. It is preferable that the outer rotor and the inner rotor are formed of metal, and more preferably of a metal of a magnetic material serving as a back yoke that forms a magnetic path.

In the meantime, it is preferable that the bushing is a molding of an electrical insulating material, for preventing a user suffering from electric shock caused by electric leakage to the rotating shaft through the inner rotor and the outer rotor, in advance.

Preferably, the first base and the second base are joined by caulking hole portions. The first base includes a plurality of embossed portions at predetermined angular intervals in a circumferential, and the embossed portion and the second base are joined by the caulking hole portions.

The second extension may include a supporting portion projected outwardly in a radial direction from an outside circumferential surface for supporting the inner magnets. The second extension may further include pass through holes under the supporting portion. The pass through holes and the supporting portion are formed by lancing.

In another aspect of the present invention, at least one of the outer rotor and the inner rotor is insert molded with the bushing as one body. Of course, the embodiment can includes all of the characters of the foregoing embodiments.

In a case the outer rotor and the inner rotor are formed as one body by the insert molding, it is apparent that the first base and the second base are also formed as one body. Accordingly, depending on embodiments, the first base and the second base are not distinguishable or unnecessary.

It is preferable that a metal plate is placed between the first extension and the outer magnets, and/or between the second extension and the inner magnets at the time the first extension or the second extension is formed by the inert molding. It is preferable that the metal plate has magnetism for serving as a back yoke.

Advantageous Effects

The present invention has the following advantages.

First, the double rotating magnet field between the magnets both on the inner rotor and the outer rotor and the stator provides a stronger torque.

Second, the align projections and the align holes at the outer rotor and the bushing permit easier and accurate positioning of the outer rotor and the bushing, since what is required for the positioning is placing the align projections in the align holes, respectively. The inner rotor and the outer rotor can be aligned and pined by the caulking hole portions. By this centers of concentric circles can be matched more effectively.

Third, the formation of the bushing, having the rotating shaft placed therein and supported thereon, by inert molding in the double rotor permits shortening a time period required for fabrication and alignment of the bushing, thereby improving productivity.

Fourth, the molding of the bushing, having the rotating shaft placed therein and supported thereon, of an electric insulating material prevents the user suffering from electric shock caused by current leaked from the motor through the rotating shaft.

Fifth, the external air circulation structure of a gap of the embossed portions between the first base and the second base, the cooling holes, the pass through holes, and the pass through slots permits more effective heat dissipation from the double rotor type motor during operation.

Sixth, the guide members at opposite sides of the cooling hole permits smooth guidance of cooling air through the cooling hole even if the rotating shaft rotates in regular/reverse direction, alternately.

Seventh, the inert molding of the double rotor permits easy formation of the cooling holes and the pass through holes without requiring any additional process.

Eighth, the inert molding of the double rotor, not of metal having a comparatively high elasticity, but of a molding material, permits to prevent twisting, and improve an overall rigidity of the double rotor.

BRIEF DESCRIPTION OF THE DRAWINGS

The accompanying drawings, which are included to provide a further understanding of the invention, illustrate embodiment(s) of the invention and together with the description serve to explain the principle of the invention. In the drawings.

BEST MODE FOR CARRYING OUT THE INVENTION

Double rotor type motors in accordance with a first preferred embodiment of the present invention will be described with reference to FIGS. 3 to 11.

Figure 3:
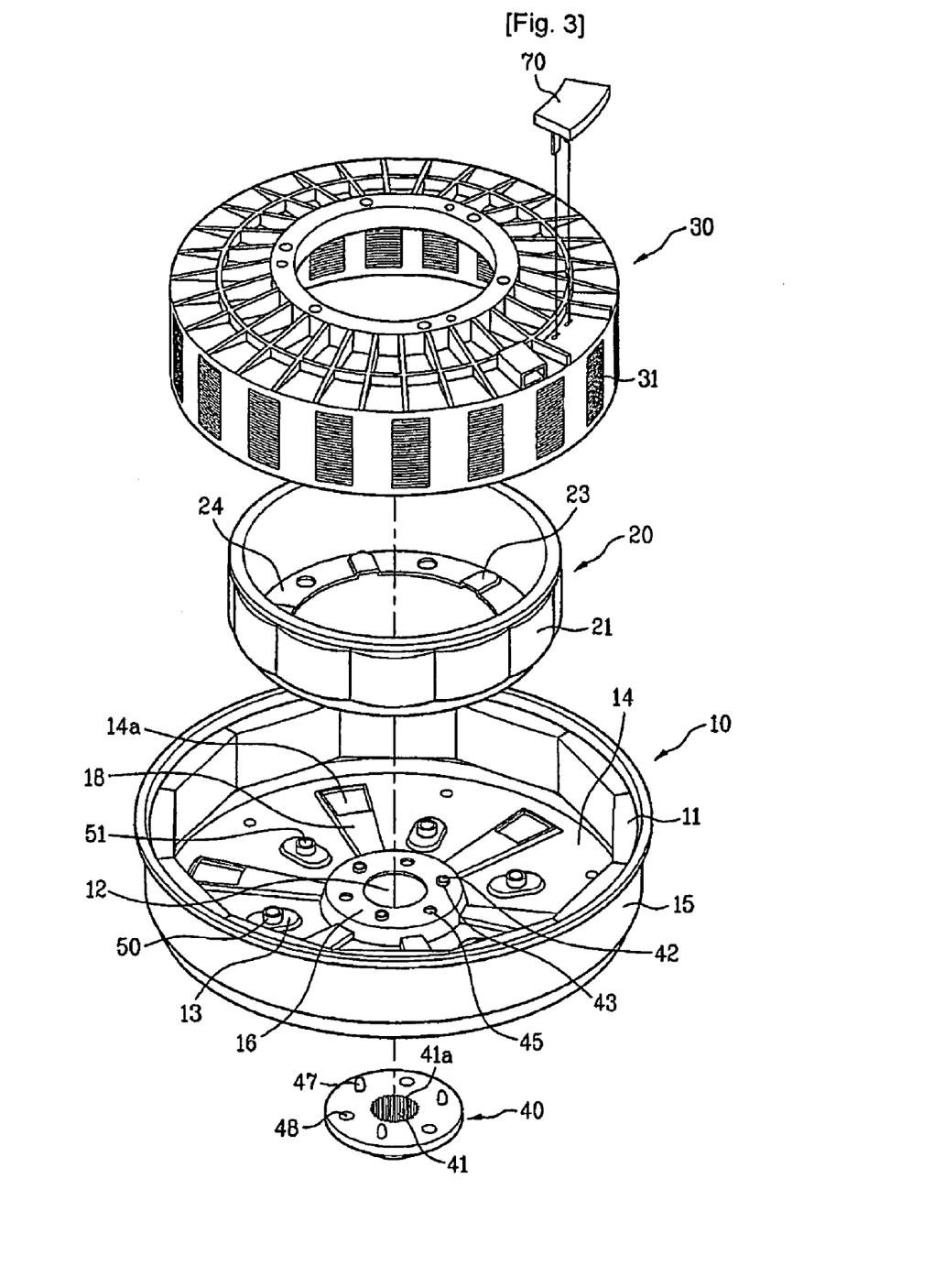
FIG. 3 illustrates an exploded perspective view a double rotor type motor in accordance with a first preferred embodiment of the present invention.
Figure 4:
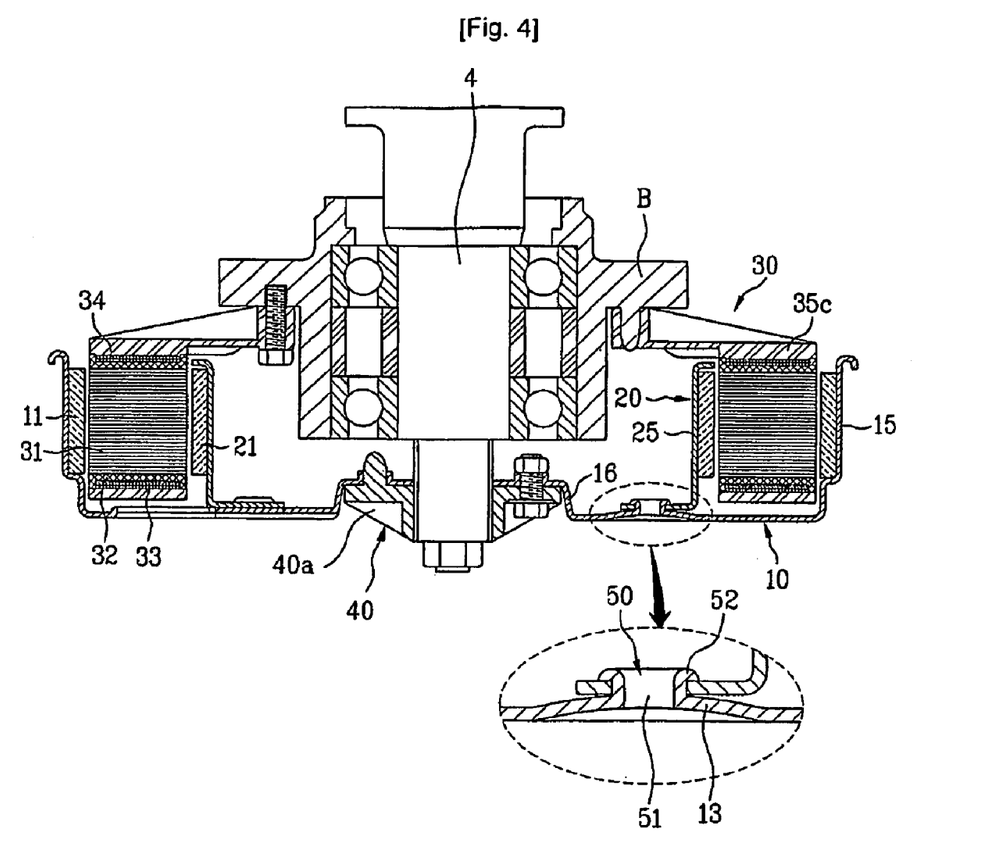
FIG. 4 illustrates a section of the double rotor type motor in FIG. 3.

FIG. 3 illustrates an exploded perspective view a double rotor type motor in accordance with a first preferred embodiment of the present invention, and FIG. 4 illustrates a section of the double rotor type motor and a portion of a motor mounting portion in accordance with a first preferred embodiment of the present invention.

Referring to FIG. 3, the double rotor type motor includes an inner rotor 20, an outer rotor 10, and a stator 30. Placed between the outer rotor 10 and the inner rotor 20, there is the stator 30, and a top side of the stator 30 is fixedly secured to a bearing housing mounted to a rear of a washing machine tub. On one side of the stator 30, there is a hall sensor 70 for detecting a rotation speed of the double rotor.

The stator 30 includes cores 31 exposed, and opposite to inner magnets 21 on the inner rotor 20 and outer magnets 11 on the outer rotor 10 from an inside and an outside of the stator 30, respectively. It is preferable that the outer magnets 11 and the inner magnets 21 are permanent magnets and the cores 31 are electromagnets According to this, because rotating magnetic fields are formed doubly between the inner magnets 21 and insides of the cores 31 and between the outer magnets 11 and outsides of the cores 31, the double type rotor can be rotated with strong torque.

In the meantime, in general, a motor-with permanent magnets has a non-uniform magnetic resistance along a distance rotated in a circumferential direction due to a segregated structure of the cores 31 and the permanent magnets having N poles and S poles magnetized in a square wave form along the circumferential direction. Consequently, the rotating magnetic field formed between the permanent magnets and the electromagnet varies with a rotation angle periodically, to cause cogging torque, which varies a speed and noise in an actual operation, to drop a performance of the motor.

In order to solve above problem, it is preferable that the permanent magnets of the outer magnets 11 and the inner magnets 21 have convex exposed surfaces, respectively. It is preferable that the exposed surface (a front surface) and a rear surface of the permanent magnet are magnetized in an N pole and an S pole, or vice versa. In this case, the permanent magnets are arranged such that N poles and S poles alternate along the circumferential direction, to form a sinusoidal wave along the circumferential direction, substantially.

By above arrangement of the permanent magnets, sharp variation of poles along the circumferential direction is prevented, to reduce the cogging torque.

Referring to FIG. 4, the rotating shaft 4 connected to the drum of the washing machine is rotatably supported on bearings in the bearing housing 'B' at a rear of the tub (see 2 in FIG. 1), and the double rotor type motor is fixedly secured to the bearing housing 'B' for driving the rotating shaft 4. The rotating shaft 4 has an end portion placed in, and supported on a bushing 40 at a center of the outer rotor 10.

The stator 30 has a top side fixed to the bearing housing 'B' and a bottom side placed between the outer rotor 10 and the inner rotor 20. The stator 30 is mounted such that an inside and an outside thereof have predetermined gaps to an inside of the outer rotor, and to an outside of the inner rotor, respectively.

In detail, the stator 30 includes a plurality of segregated split cores 31, an insulator 32 of insulating resin around the split cores 31, a coil 34 wound around the insulator 32, a supporting portion 35c for supporting the insulators 32 and the coils 34. Of course, the core is not limited to the split core.

The outer rotor 10 includes a first base 14, a first extension 15 extended from a circumference of the first base 14 substantially perpendicular thereto having the outer magnets 11 mounted to an inside circumferential surface. The outer magnets 11 are a plurality of permanent magnets with N poles and S poles arranged alternately along a circumferential direction.

The inner rotor 20 includes a second base 24 mounted on an upper surface of the first base 14, and a second extension 25 extended from a circumference of the second base 24 so as to be opposite to the first extension 15 with a predetermined gap toward an inner side of the first extension 15 having the inner magnets 21 mounted to an outside circumferential surface. The inner magnets 21 are a plurality of permanent magnets with N poles and S poles arranged alternately along a circumferential direction of the second extension 25.

In the meantime, the first base 14 and the second base 24 are pined with caulking hole portions 50 each formed by pressing and caulking.

In detail, an inside circumferential surface of the inner rotor 20 and an outside circumferential surface of the outer rotor 10 are aligned by an aligning device automatically after the inner rotor 20 and the outer rotor 10 are placed on a press die for forming the caulking hole portions 50.

Then, the bases 14 and 24 are joined together by forming a hole 51 passing through the first base 14 and the second base 24, and bending and pressing down a circumference of the hole 51. That is, the second base 24 and the first base 14 are pined together as the second base 24 is clamped between a caulked portion 52 at a circumference of the hole 51, and the top side of the first base 14. It is preferable that a plurality of the caulking hole portions 50, at least two, are formed along a circumferential direction of the bases 14, and 24 with regular intervals.

Instead of the caulking hole portions 50, the first base 14 and the second base 24 may be pined together with a TOX joint, or fastening of bolts, or the like. In the TOX round jointing, two metal plates put on the other are placed on a die for the TOX round jointing having a groove, and pressed by a press, to join the plates.

It is preferable that, before forming the caulking hole portion 50 or making the TOX round jointing, an embossed portion 13, embossed upward at a predetermined depth, is formed by pressing at a position of the first base 14 where the second base 24 is to be jointed thereto. It is preferable that a plurality of the embossed portions 13 are formed in a circumferential direction of the first base 14 at regular angular intervals, for reinforcing strength of the first base 14. After the embossed portions 13 are formed, the caulking hole portions 50 or the TOX round jointing are made at portions the embossed portions 13 and the second base 24 are in contact with the other.

Referring to FIGS. 3 and 4, the embossed portions 13 are embossed upward from the first base 14, and the second base 24 is placed on the embossed portions 13. According to this, a gap is formed between the top side of the first base 14 and an underside of the second base 24 at a region no embossed portions 13 are formed. Through the gap, air flows from the inside of the inner rotor 20, to cool down portions heated during operation of the motor.

The first base 14 has a plurality of cooling holes 14a in a circumferential direction at predetermined angular intervals between the first extension and the second extension 25, for flow of air therethrough during rotation of the double rotor, to cool down the motor.

It is preferable that at least one pass through hole 26 is formed in the second extension 25 under the portion the inner magnets 21 are mounted thereon in a circumferential direction at predetermined angular intervals, for making the inside of the inner rotor 20 and a space between the first extension 15 and the second extension 25, and blowing air therethrough to cool down heated motor.

According to this, the gap between the first base 14 and the second base 24 formed by the embossed portions 13, the cooling holes 14a, and the pass through holes 26 form an air circulation structure, to cool down the motor more effectively.

At the time of formation of the pass through holes 26, one side of the second extension 25 is cut partially to bend upward to form a supporting portion 27 by lancing or the like, such that supporting portions 27 are projected outwardly in a radial direction along an outside circumferential direction of the second extension 25. The supporting portion 27 supports a bottom of the inner magnet 21 on the outside circumference of the second extension 25.

The inner magnet 21 is attached to the outside circumferential surface of the second extension 25 with adhesive. However, the inner magnet 21 is liable to fall off outwardly by centrifugal force generated as the double rotor rotates at a high speed. Therefore, the inner magnet 21 at the bottom is attached to the top side of the supporting portion 27, to increase an attached area, to prevent the inner magnet 21 from falling off. Moreover, a tip of the supporting portion 27 may be bent upward, to hold a lower side of the inner magnet 21.

It is preferable that a top edge of the first extension 15 is curled outwardly for reinforcing. The second extension 25 also can be curled outwardly for reinforcing. In this instance, since the inner magnet is mounted on the outside circumference of the second extension 25, it is preferable that a top edge width 'D' of the curled portion is smaller than a thickness of the magnet 21.

In the meantime, referring to FIGS. 3 and 4, it is preferable that there is a bushing receiving portion 16 projected upward from around an opening in the first base 14. This is for preventing a portion of the bushing 40 projected beyond an underside of the double rotor from occupying a space, unnecessarily.

At a center of the bushing 40, there is a hole 41 for placing the rotating shaft therein, with a serration 41a for engagement with a serration on an outside circumferential surface of the rotating shaft. As shown in FIG. 4, it is preferable that the bushing 40 has at least one rib 40a of a sloped shape on an outside circumferential surface for reinforcing strength. It is preferable that a plurality of ribs 40a are formed at predetermined intervals along a circumferential direction of the bushing 40.

The bushing 40 is fastened to a portion around the opening 12 at the center of the outer rotor 10 with bolts, or the like, passed through holes 45, and 48 in the bushing 40 and the bushing receiving portion 16, respectively.

A double rotor type motor in accordance with a first preferred embodiment of the present invention will be described with reference to FIGS. 5 to 8.

Figure 5:
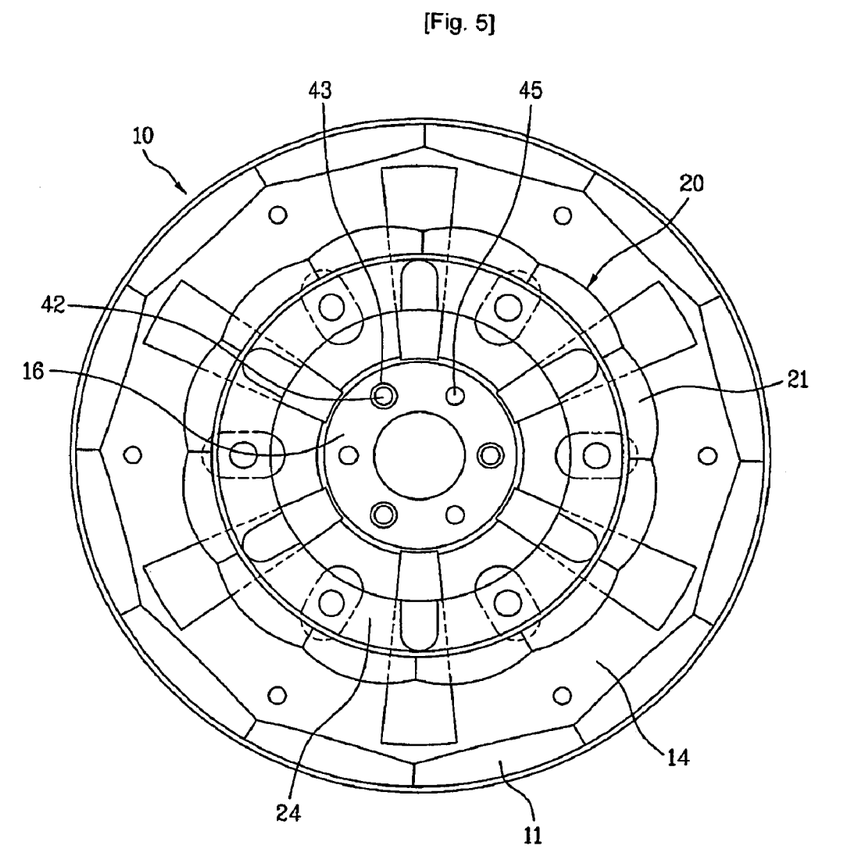
FIG. 5 illustrates a plan view of the double rotor type motor in FIG. 3.

FIG. 5 illustrates a plan view of a rotor of the double rotor type motor in accordance with a first preferred embodiment of the present invention.

Referring to FIG. 5, the bushing receiving portion 16 has align holes 42 along a circumferential direction, preferably 3 holes at 120 degree angle intervals.

Referring to FIG. 3, the bushing 40 has align projections 47 projected from a top surface for placing in the align holes 42. Once the align projections 47 are placed in the align holes 42 respectively, concentric centers of the bushing 40 and the outer rotor 10 are aligned exactly. It is preferable that the align projections 47 are press fit to the align holes 42, respectively. The present invention is not limited to above structure, but it is preferable that the align holes may be formed at one of the center of the first base 14 and the top of the bushing 40, and the align projections may be formed at the other one, opposite to the one, in conformity with a shape of the align holes.

Moreover, it is preferable that the align hole 42 has a cylindrical portion 43 around the align hole 42 having a diameter the same with the align hole 42 for guiding placing of the align projection 47 therein. Though the cylindrical portion 43 may be attached to a portion around the align hole 42, it is preferable that the cylindrical portion 43 is formed as one body with the bushing receiving portion 16 by pressing at the time of formation the align hole 42.

Figure 6:
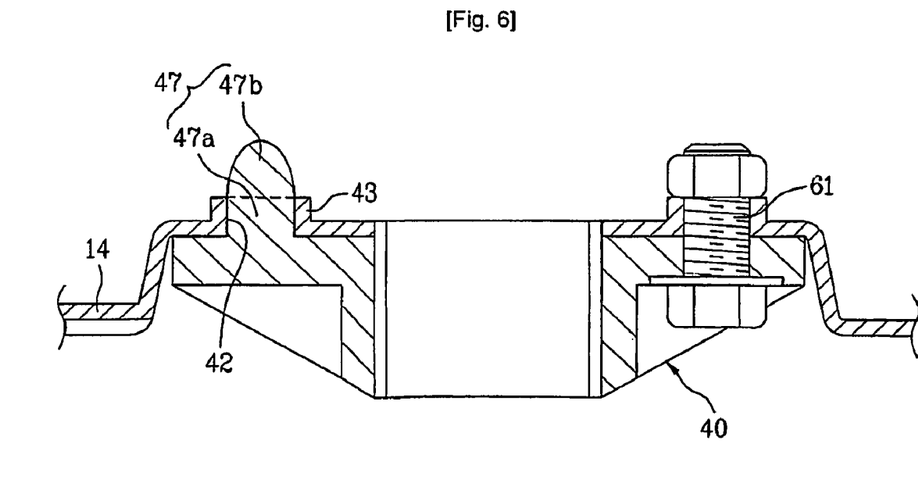
FIGS. 6 and 7 illustrate sections each showing a variation of the outer rotor and the bushing in FIG. 3.
Figure 7:
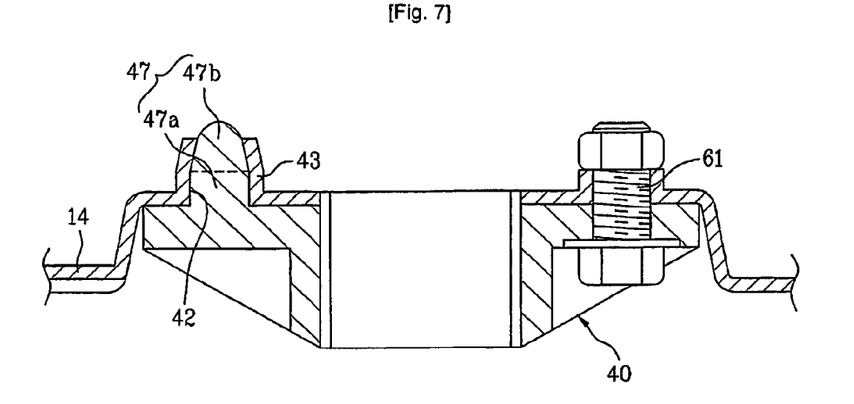

FIGS. 6 and 7 illustrate sections each showing a variation of a joining structure of the align projection and the align hole.

Referring to FIG. 6, the align projection 47 includes a body portion 47a having the same diameter, and a guide portion 47b having a diameter which becomes the smaller as it goes from the body portion 47a toward a tip thereof the more. Therefore, the guide portion 47b having a pointed tip can be inserted into the align hole 42 easily, and an outside circumference of the body portion 47a is inserted in the cylindrical portion 43 around the align hole 42, thereby aligning the align projection 47 and the align hole 42, exactly.

On the other hand, referring to FIG. 7, it is also viable that an inside diameter of the cylindrical portion 43 becomes the smaller as it goes toward the tip the more, and, in correspondence to this, an outside diameter of the body portion 47a also becomes the smaller as it goes toward an end of the body portion 47a.

After the align projections 47 are placed in the align holes 42 respectively, the bushing receiving portion 16 and the bushing 40 are pined together by screws or bolts-nuts 61 fastened thereto at predetermined angular intervals in a circumferential direction. For this, the bushing and the bushing receiving portion have fastening holes (see 45 in FIG. 5) for placing the bolts or the like.

Figure 8:
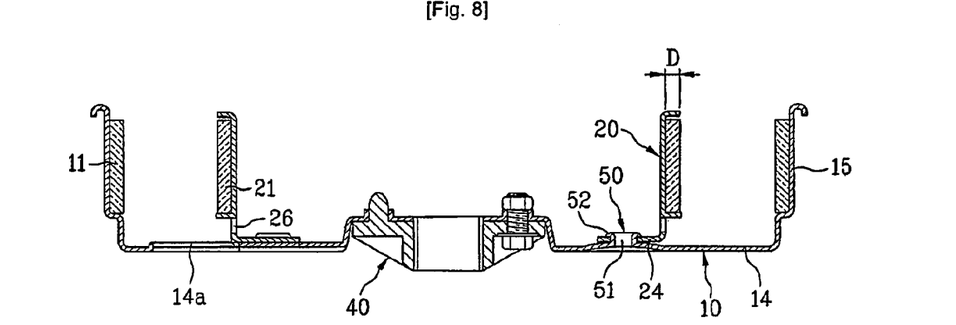
FIG. 8 illustrates a section of the double rotor type motor in FIG. 3.

FIG. 8 illustrates a section of a double rotor type motor in accordance with a first preferred embodiment of the present invention.

Referring to FIG. 8, the double rotor in accordance with a first preferred embodiment of the present invention may be of a type in which an outer rotor is joined with an inner rotor and a bushing respectively, or another type in which an inner rotor is joined with an outer rotor and a bushing respectively, or, of course, a type in which a bushing is joined with an outer rotor and an inner rotor. Methods of the joining are the same as described before.

As described before, the double rotor in accordance with a first preferred embodiment of the present invention provides an exact and easy align structure for joining the inner rotor; the outer rotor, and the bushing together.

A structure for cooling the motor in accordance with a first preferred embodiment of the present invention will be described with reference to FIGS. 9 to 11 in more detail. Of course, the motor cooling structure is also applicable to other embodiments of the present invention, and FIGS. 9 and 10 each illustrates pass through slots 151, and 152.

Figure 9:
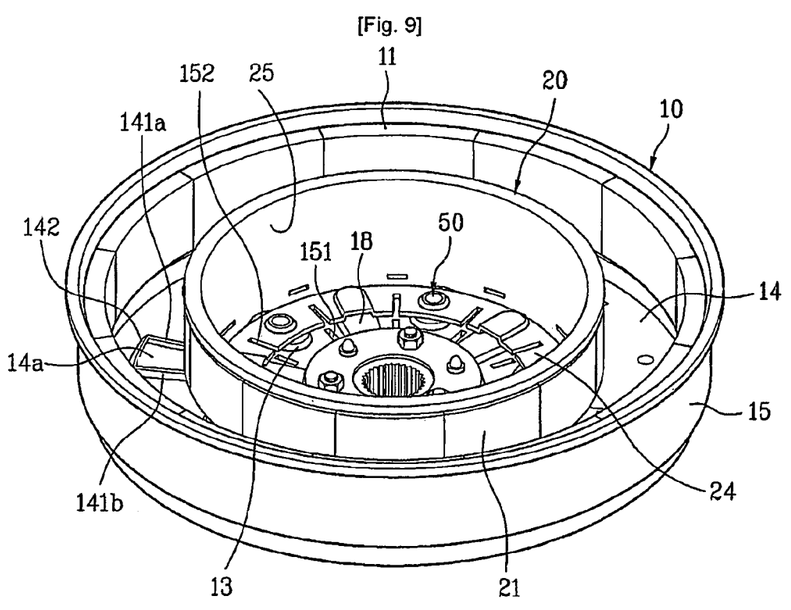
FIG. 9 illustrates a perspective view of an assembly of the double rotor type motor in FIG. 3 showing a cooling structure thereof in detail.
Figure 10:
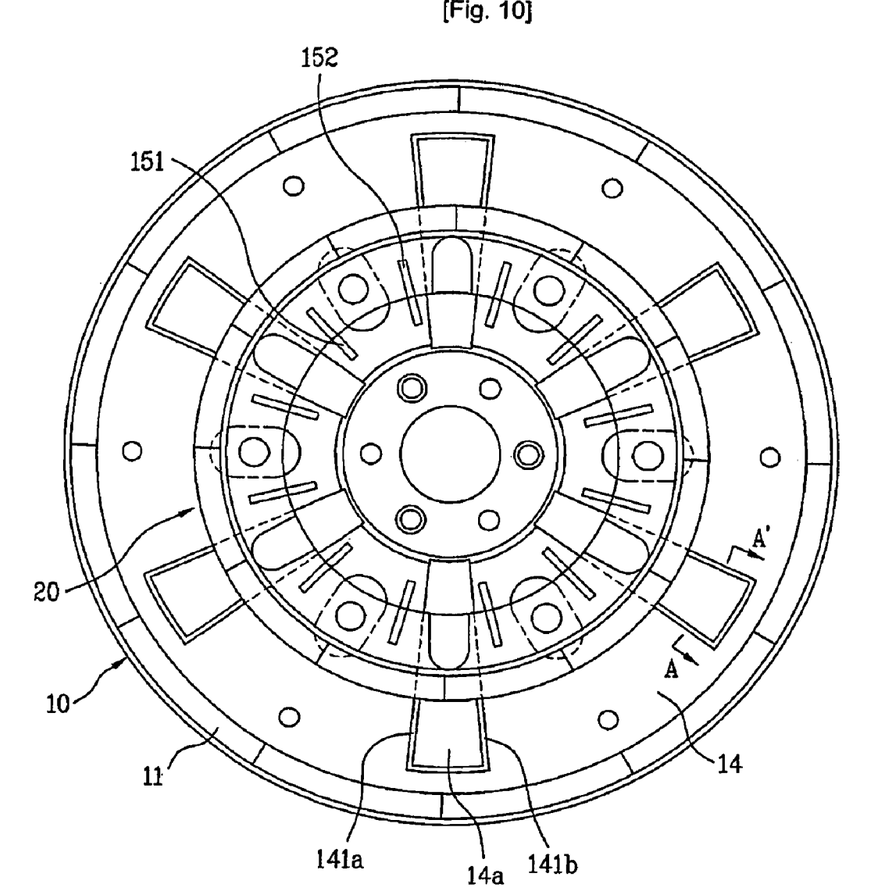
FIG. 10 illustrates a plan view of the double rotor type motor in FIG. 9.
Figure 11:
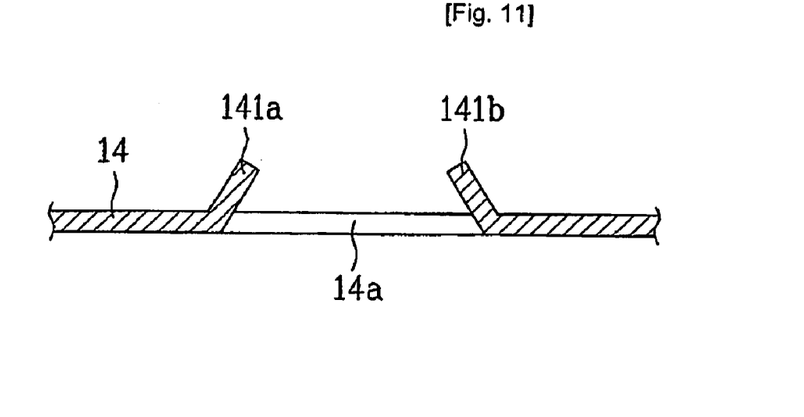
FIG. 11 illustrates an enlarged view of a section across a line A-A' in FIG. 10.

Referring to FIGS. 9 to 11, the embossed portion 13 is projected upward from the first base 14, and the second base 24 is placed on the embossed portion 13. Therefore, at the region having no embossed portions 13 formed thereon, there is the predetermined gap between the top surface of the first base 14 and the underside of the second base 24, through which gap air flows from the inside of the inner rotor 20 to cool portions heated during operation of the motor.

Moreover, for pass through of the air for cooling the motor, the first base 14 has cooling holes 14a. As shown in FIG. 10, it is preferable that a plurality of the cooling holes 14a are formed in the first base 14 along a circumferential direction at predetermined angular intervals between the first extension 15 and the second extension 25.

There are guide members 141a, and 141b projected upward or downward from opposite circumferential direction edges of the cooling hole 14a. Even in a case the motor rotates alternately in regular/reverse directions, the opposite guide members guide air to be blown through the cooling hole 14a smoothly, thereby preventing the motor from overheating.

That is, while air is guided by one of the guide member 141a when the motor rotates in one direction, the air is guided by the other guide member 141b when the motor rotates in an opposite direction.

Moreover, in addition to the guide members 141a, and 141b at opposite circumferential direction edges of the cooling hole 14a, it is preferable that supplementary guide members 142 are provided at opposite radial direction edges of the cooling hole 14a.

Accordingly, the air flows from an upper side of the first base 14 to an outside of the motor through the cooling holes 14a, or external air is introduced into the rotor through the cooling holes 14a. Moreover, air may flow from the inside of the inner rotor 20 through the cooling holes 14a after passing through the predetermined gap between the underside of the second base 24 and the first base 14. Above air circulation structure enables dissipation of heat from the motor.

Though the guide members 141a, and 141b may be separate pieces, it is preferable that the guide members 141a, and 141b are formed as one body with the first base 14. The guide members 141a, and 141b may be formed by lancing at the edges of the cooling hole 14a.

FIG. 11 illustrates an enlarged view of a section across a line A-A' in FIG. 10.

Referring to FIG. 11, it is preferable that the guide members 141a, and 141b are slanted toward an inner side of the cooling hole 14a for making a flow line of air passing through the cooling hole 14a smooth. In the meantime, the guide member may have a variety of shapes of a section, such as curved section fitted at opposite edges of the cooling hole.

In the meantime, referring to FIGS. 9 and 10, both the first base 14 and the second base 24 have pass through slots 151, and 152 at opposite positions for making an inside space of the inner rotor 20 in communication with an outside of the motor. That is, the formation of the pass through slots 151, and 152 at opposite positions of the first base 14 and the second base 24 enables smooth movement of air through the pass through slots 151, and 152. It is preferable that the pass through slots 151, and 152 are formed between adjacent caulking hole portions 50 and embossed portions 13 respectively, because there are the plurality of caulking hole portions 50 and embossed portions 13 along the circumferential direction at portions the first base 14 and the second base 24 are in contact.

In this instance, since a space between adjacent caulking hole portions 50 and embossed portions 13 are small, it is preferable that the pass through slots 151, and 152 are elongated in a radial direction of the bases 14, and 24. Moreover, referring to FIG. 10, it is preferable that a plurality of the pass through slots 151, and 152 are formed in a circumferential direction of the bases 14, and 24 at predetermined angular intervals.

Therefore, the movement of external air through the pass through slots during rotation of the double rotor enables to cool down the heated portions, effectively.

That is, the air, passed through the cooling holes and the pass through slots which are in communication with an outside of the motor, flows through the pass through holes and the gap between the first and second bases 14 and 24 formed by the embossed portions 13, thereby cooling the inside space of the double rotor type motor, more uniformly, and effectively.

As described before, the double rotor type motor of the present invention includes an air circulation structure formed of the gap between the first and second bases 14 and 24 formed by the embossed portions 13, the cooling holes 14a, the pass through holes 26, and the pass through slots 151, and 152, to cool the motor more effectively during operation.

Mode for the Invention

Other embodiments of the present invention will be described with reference to the attached drawing 12 to 17, in detail.

A double rotor type motor in accordance with a second preferred embodiment of the present invention will be described with reference to FIGS. 12 to 14. Different from the first embodiment of the present invention, as the most distinctive characteristic, the second preferred embodiment of the present invention includes an insert molded bushing.

Figure 12:
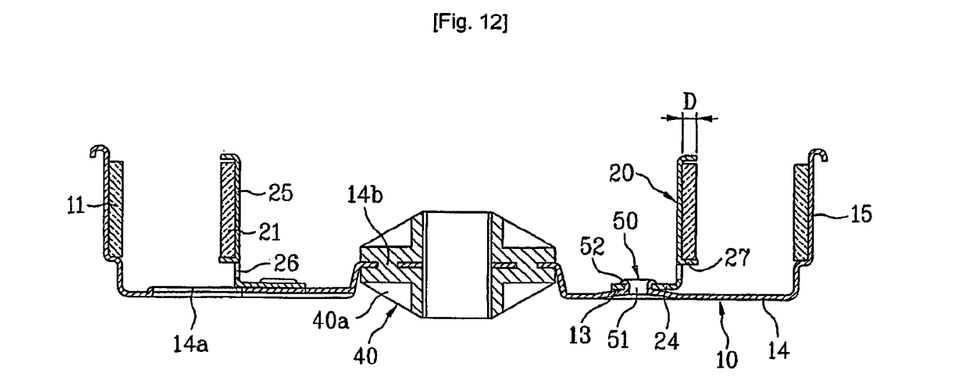
FIGS. 12 to 14 illustrate sections showing variations of a double rotor type motor in accordance with a second preferred embodiment of the present invention, respectively.
Figure 13:
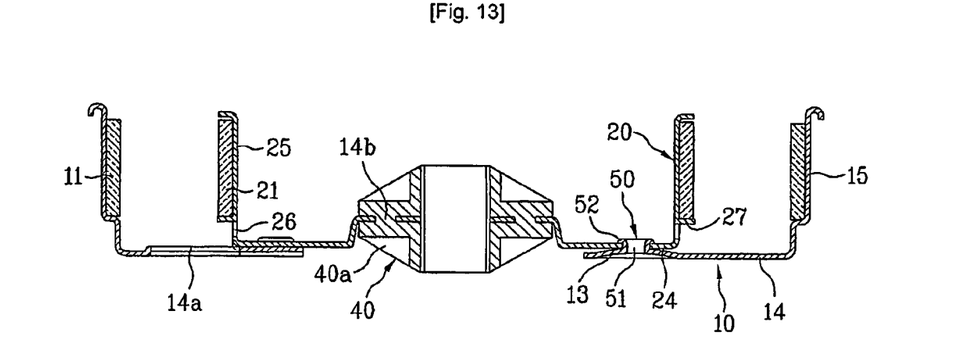
Figure 14:
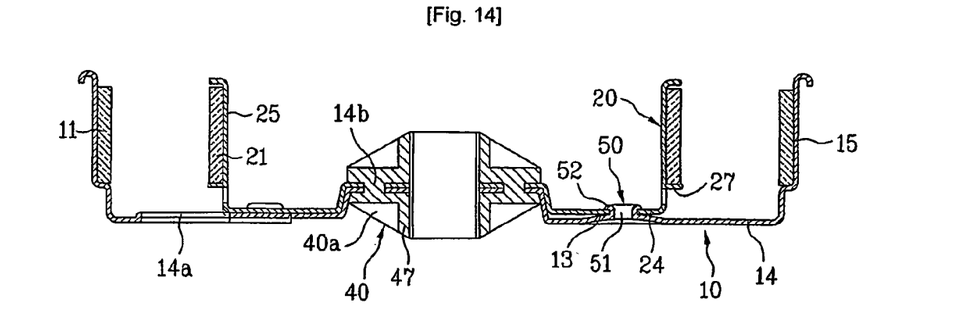

Referring to FIGS. 12 to 14, the bushing is fastened to the outer rotor and/or to the inner rotor, not by separate fastening means. FIG. 12 illustrates a type in which the bushing is insert molded in the outer rotor, FIG. 13 illustrates a type in which the bushing is insert molded in the inner rotor, and FIG. 14 illustrates a type in which the bushing is insert molded both in the outer rotor, and the inner rotor at the same time.

Because the double rotor type motor in accordance with the second preferred embodiment of the present invention has a structure identical to the double rotor type motor in accordance with the second preferred embodiment of the present invention, except a structure of the bushing 40 provided by the insert molding, description of the identical part will be omitted. Since insert molding methods are identical in the cases of FIGS. 12 to 14, only the type of FIG. 12 will be described.

Referring to FIG. 12, the bushing 40 may be insert molded around the opening at the center of the outer rotor 10. That is, after placing a mold around the opening of the outer rotor 10, a material to be molded is cast, to form the bushing 40. It is preferable that the outer rotor 10 and the inner rotor 20 are formed of metal.

Moreover, it is preferable that the bushing 40 is formed of an electric insulating material, for preventing electricity, supplied to the stator through the outer rotor and the inner rotor of metal, from leaking to an outside of the motor through the rotating shaft, thereby preventing the user from being shocked by the electricity.

In the meantime, in a portion around the opening in the outer rotor 10, there are holding holes 14b for having material of the bushing 40 filled therein and held together with the outer rotor 10 at the time of the insert molding. Therefore, the material filled into the mold is set in a state the material is filled in upper and lower sides of the portion around the bushing 40, and the holding holes 14b.

At the same time with the formation of the bushing 40 by the insert molding, the outer rotor 10 and the bushing 40 are aligned. That is, at the time of the insert molding, the bushing 40 and the outer rotor 10 are aligned such that center points of the bushing 40 and the outer rotor 10 are the same.

In a case the bushing is fabricated separately, and fastened to the portion around the opening like the first preferred embodiment of the present invention, a time period for fabricating the bushing, and a time period for aligning the bushing with the outer rotor are required, additionally. However, the double rotor type motor in accordance with the second preferred embodiment of the present invention enables faster formation of the bushing at an exact position, and to eliminate a separate pining step between the bushing and the outer rotor and/or inner rotor, to simplify an assembly process.

In the meantime, it is evident that a type illustrated in FIG. 13 enables to make the opening of the outer rotor to have a greater radius than the type illustrated in FIG. 12 or 14, and, therefore, is effective in reduction of a material cost. Moreover, it is evident that a type illustrated in FIG. 14 enables to make a pining force between the outer rotor, the inner rotor, and the bushing greater than the type illustrated in FIG. 12 or 13.

A double rotor type motor in accordance with a third preferred embodiment of the present invention will be described with reference to FIGS. 15 to 17.

In the embodiment, at least one of the outer rotor and the inner rotor is insert molded with the bushing to form one body. Therefore, except above character, the embodiment is also the same with the foregoing embodiments.

Figure 15:
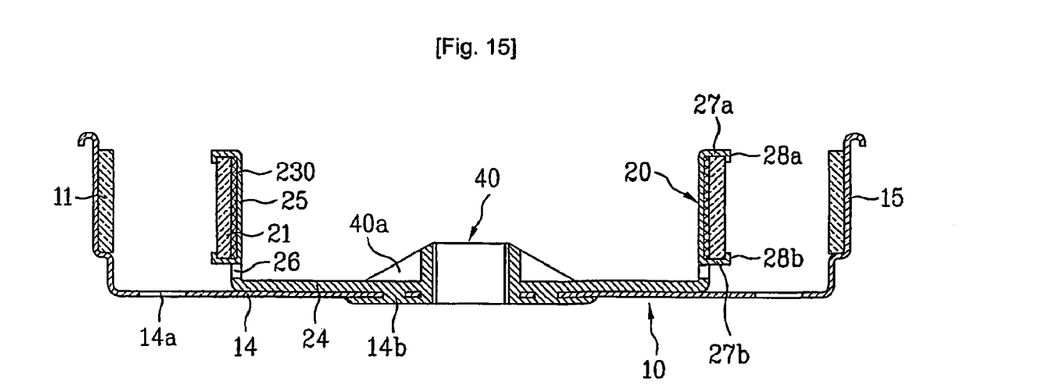
FIGS. 15 to 17 illustrate sections showing variations of a double rotor type motor in accordance with a third preferred embodiment of the present invention, respectively.

FIG. 15 illustrates the bushing 40 and the inner rotor 20 are insert molded as one body such that the outer rotor is pined with the bushing and the inner rotor by the inert molding.

Figure 16:
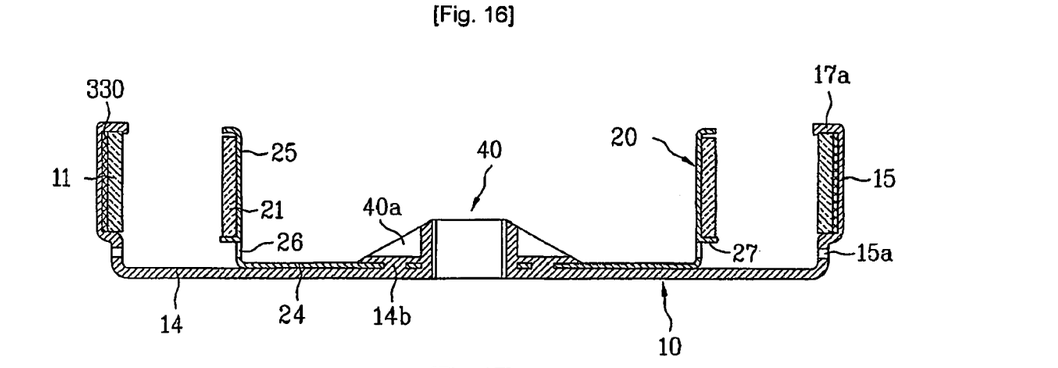

Opposite to a case of FIG. 15, FIG. 16 illustrates the bushing 40 and the outer rotor 10 insert molded as one body such that the inner rotor is pined with the bushing and the outer rotor by the insert molding.

Figure 17:
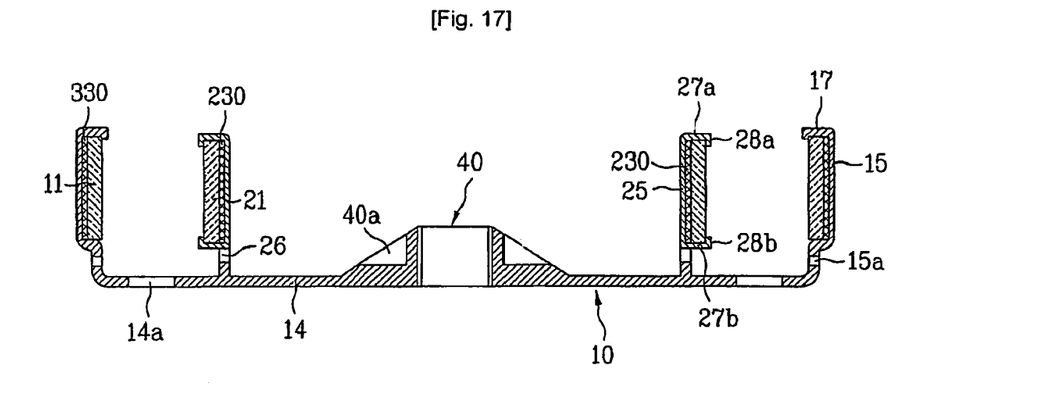

FIG. 17 illustrates the outer rotor, the inner rotor, and the bushing formed as one body by insert molding.

Because it is preferable that the inner rotor and/or the outer rotor are formed of resin in the third preferred embodiment of the present invention, a member of a magnetic material is required for serving as a back yoke to form a magnetic path.

Accordingly, it is preferable that a metal plate 230 or 330 is placed between the first extension and the outer magnet and/or the second extension and the inner magnet for serving as a back yoke at the time of formation of the first extension and/or second extension by insert molding.

In the meantime, referring to FIG. 15, in a case the inner rotor 20 is formed as one body with the bushing 40 at the time of insert molding, the second extension 25 is also formed of resin. Accordingly, in this case, it is possible that the inner magnets 21 are joined with the second extension as one body at the time of insert molding. This method enables to cult a step for joining the inner magnets with the second extension by separate adhesive.

Of course, in this case too, as shown in FIG. 15, for preventing the inner magnets 21 from flying away, both an upward projection 28b from an edge of a supporting portion 27b and a downward projection 28a from an edge of the extension 27a may be provided, further.

The projections 28a, and 28b enables rigid joining of the inner magnets to the second extension.

In the meantime, description of the motors with reference to FIGS. 16 and 17 will be omitted as far as the description is the same with the description of the motor made with reference to FIG. 15.

Because the outer rotor in FIG. 16 or 17 is a resin molding, similar to the pass through holes 26 of the inner rotor, pass through holes 15a may be formed at a portion of the outer rotor under the step having the outer magnets supported thereon. In this case, it is also possible that a projection 17a is further provided to surround a portion of a top side of the outer magnets.

At the end, the present invention provides a double rotor type motor including the outer rotor, the inner rotor, and the bushing, and is not limited to joining methods or material of the outer rotor, the inner rotor, and the bushing.

In the meantime, in embodiments of the double rotor type motor of the present invention, though the description is made based on the stator mounted on the bearing housing 'B' of a washing machine, the stator may be mounted to a rear wall of the tub (see FIG. 1) or other part concentric with the rotating shaft 4.

The double rotor type motor of the present invention is applicable, not only to a washing machine, but also to an air conditioner, or other apparatus, in the sane or similar fashion.

INDUSTRIAL APPLICABILITY

As has been described, the double rotor type motor of the present invention permits to provide a motor which can provide relatively high torque and easy to fabricate without increasing a size of the motor, as well as a motor which can dissipate heat effectively, and prevent a user suffering from electric shock through a rotating shaft.

The invention claimed is:

1. A double rotor type motor, comprising:
   an outer rotor, comprising:
      a first base;
      a first extension that extends from a circumference of the first base, substantially perpendicular thereto; and
      outer magnets mounted on an inner circumferential surface of the first extension;
   an inner rotor, comprising:
      a second base concentrically mounted on an upper surface of the first base;
      a second extension that extends from a circumference of the second base, substantially perpendicular thereto, so as to be positioned opposite the first extension such that a predetermined gap is formed between an inner side of the first extension and an outer side of the second extension; and
      inner magnets mounted on an outer circumferential surface of the second extension;
   a bushing installed at a center of the first base and the second base so as to transmit a rotation force from both the outer rotor and the inner rotor to a rotating shaft; and
   caulking hole portions that simultaneously align and join the first base and the second base while also maintaining a prescribed gap between the first base and the second base.

2. The double rotor type motor as claimed in claim 1, wherein the first base and the second base each have an opening formed at a respective center thereof, and wherein the bushing is mounted on a portion surrounding the opening formed in at least one of the first base or the second base.

3. The double rotor type motor, as claimed in claim 2, wherein the portion surrounding the opening on which the bushing is mounted projects upward from the at least one of the first base or the second base.

4. The double rotor type motor as claimed in claim 2, wherein the rotating shaft is received in and supported by the bushing.

5. The double rotor type motor as claimed in claim 2, wherein the bushing is insert molded.

6. The double rotor type motor as claimed in claim 5, wherein the bushing is a molding of an electrical insulating material.

7. The double rotor type motor as claimed in claim 5, wherein the portion surrounding the opening formed in the at least one of the first base or second base on which the bushing is mounted has holding holes formed therein for receiving molding material of the bushing therein so as to insert mold the bushing.

8. The double rotor type motor as claimed in claim 1, wherein the outer rotor and the inner rotor are formed of metal.

9. The double rotor type motor as claimed in claim 1, wherein the first base includes a plurality of embossed portions formed at predetermined angular intervals in a circumferential direction of the first base for reinforcing strength.

10. The double rotor type motor as claimed in claim 9, wherein the plurality of embossed portions and the second base are joined by the caulking hole portions.

11. The double rotor type motor as claimed in claim 1, wherein the second extension includes a supporting portion that projects outwardly in a radial direction from the outer circumferential surface of the second extension for supporting the inner magnets.

12. The double rotor type motor as claimed in claim 11, wherein the second extension includes pass through holes formed under the supporting portion.

13. The double rotor type motor as claimed in claim 12, wherein the pass through holes and the supporting portion are formed by lancing.

14. The double rotor type motor as claimed in claim 1, wherein the bushing is secured to an underside of the first base.

15. The double rotor type motor as claimed in claim 14, further comprising:
   alignment holes formed in one of a central portion of the first base or an upper side of the bushing; and
   alignment projections formed in the other of the central portion of the first base or the upper side of the bushing wherein the alignment proections are inserted into the alignment holes so as to align the bushing and the first base for coupling.

16. The double rotor type motor as claimed in claim 14, wherein the first base includes a bushing receiving portion that projects upward from a central portion thereof, wherein the bushing receiving portion receives the bushing therein.

17. The double rotor type motor as claimed in claim 16, further comprising:
   alignment holes formed in one of the bushing receiving portion of the first base or an upper side of the bushing, arranged in a circumferential thereof; and
   alignment projections formed in the other of the bushing receiving portion of the first base or the upper side of the bushing, at positions corresponding to the alignment holes.

18. The double rotor type motor as claimed in claim 16, wherein the bushing receiving portion and the bushing are fastened together with screws fastened at predetermined angular intervals in a circumferential direction.

19. The double rotor type motor as claimed in claim 1, wherein a top edge of the first extension and a top edge of the second extension each curl outwardly for reinforcing strength.

20. A double rotor type motor, comprising:
   an outer rotor, comprising:
      a first base;
      a first extension that extends from a circumference of the first base, substantially perpendicular thereto; and
      outer magnets mounted on an inner circumferential surface of the first extension;
   an inner rotor comprising:
      a second base mounted on an upper surface of the first base concentric to the first base;
      a second extension that extends from a circumference of the second base, substantially perpendicular thereto, so as to be positioned opposite the first extension such that a predetermined gap is formed between an inner side of the first extension and an outer side of the second extension; and inner magnets mounted on an outer circumferential surface of the second extension;

a stator that generates a rotating magnetic field between the outer magnets and the inner magnets so as to rotate the outer rotor and the inner rotor; and a bushing installed at a center of the first base and the second base so as to transmit a rotation force from both the outer rotor and the inner rotor to a rotating shaft; and caulking hole portions that simultaneously align and join the first base and the second base while maintaining a prescribed gap between the first base and the second base.

21. The double rotor type motor as claimed in claim 20, wherein the stator includes cores each having a coil wound thereon, wherein the cores are positioned between the first extension and the second extension so as to form the rotating magnetic field between the outer magnets and the inner magnets.

22. The double rotor type motor as claimed in claim 1, wherein the first base includes a plurality of cooling holes arranged in a circumferential direction thereof.

23. The double rotor type motor as claimed in claim 22, wherein the cooling holes are formed in an area of the first base that is positioned between the first extension and the second extension.

24. The double rotor type motor as claimed in claim 23, wherein the each of the cooling holes include guide members provided at edges thereof for guiding movement of air therethrough.

25. The double rotor type motor as claimed in claim 1, further comprising pass through slots formed in the first base and an in the second base, at positions opposite each other, so as to provide for communication between an inside space of the inner rotor and an outside of the motor.

26. The double rotor type motor as claimed in claim 25, wherein the pass through slots are elongated in a radial direction of the first and second bases, respectively, and arranged in a circumferential direction at predetermined angular intervals.

27. The double rotor type motor as claimed in claim 1, wherein the bushing is insert molded together with at least one of the outer rotor or the inner rotor so as to form one body with the at least one of the outer rotor or the inner rotor.

28. The double rotor type motor as claimed in claim 27, further comprising a metal plate positioned between the first extension and the outer magnets, or between the second extension and the inner magnets during insert molding, wherein the metal plate serves as a back yoke.

29. The double rotor type motor as claimed in claim 27, wherein the first base and the second base are formed as one body at the time the outer rotor and the inner rotor are formed as one body by the insert molding.

30. The double rotor type motor as claimed in claim 1, wherein each of the caulking hole portions comprises:
a hole formed in one of the first base or second base; and
a protrusion that protrudes from the other of the first base or the second base so as to be inserted into and secured in the hole.

31. The double rotor type motor as claimed in claim 30, wherein the protrusion comprises a hollow pipe that is inserted into the hole and pressed so as to join the first base and the second base.

32. The double rotor type motor as claimed in claim 20, wherein each of the caulking hole portions comprises:
a hole formed in one of the first base or second base; and
a protrusion that protrudes from the other of the first base or the second base so as to be inserted into and secured in the hole.

33. The double rotor type motor as claimed in claim 32, wherein the protrusion comprises a hollow pipe that is inserted into the hole and pressed so as to join the first base and the second base.

* * * * *